US010384628B2

(12) United States Patent
Mohrmann et al.

(10) Patent No.: US 10,384,628 B2
(45) Date of Patent: Aug. 20, 2019

(54) ON-BOARD ELECTRICAL SYSTEM FOR MOTOR VEHICLES COMPRISING A CONVERTER AND A HIGH-LOAD CONSUMER

(71) Applicant: Ford Global Technologies, LLC, Dearborn, MI (US)

(72) Inventors: Bjoern Mohrmann, Aachen (DE); Armin Warm, Aachen (DE); Peter Schmitz, Aachen (DE); Manuel Bojahr, Aachen (DE); Engbert Spijker, Nuth (NL); Mark Eifert, Frankfurt (DE)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 15/663,383

(22) Filed: Jul. 28, 2017

(65) Prior Publication Data

US 2018/0029545 A1   Feb. 1, 2018

(30) Foreign Application Priority Data

Jul. 29, 2016   (DE) .......................... 10 2016 213 978

(51) Int. Cl.
*B60R 16/033* (2006.01)
*H02M 3/04* (2006.01)
(Continued)

(52) U.S. Cl.
CPC .............. *B60R 16/033* (2013.01); *H02J 1/08* (2013.01); *H02J 1/102* (2013.01); *H02J 1/108* (2013.01);
(Continued)

(58) Field of Classification Search
CPC ...... B60R 16/033; B60R 16/037; H02M 3/04; H02J 7/04; H02J 7/1438; H02J 7/345;
(Continued)

(56) References Cited

U.S. PATENT DOCUMENTS 5,179,508 A    1/1993  Lange et al.
6,384,489 B1 *  5/2002  Bluemel .................. H02J 1/08
                                                      307/10.1
(Continued)

FOREIGN PATENT DOCUMENTS

DE    10248658 A1    5/2004
DE    10392456 T5    6/2005
(Continued)

OTHER PUBLICATIONS

Ting, Y. et al., "A Modular DC-DC Converter with Collapsible Input Voltage of Series Connected Modules without Additional Bypass Switch," Proceedings of the 2013 Energy Conversion Congress and Exposition, Sep. 15, 2013, Denver, Colorado, 6 pages.
(Continued)

*Primary Examiner* — Fritz M Fleming
*Assistant Examiner* — Jagdeep S Dhillon
(74) *Attorney, Agent, or Firm* — Frank Lollo; McCoy Russell LLP

(57) ABSTRACT

Methods and systems are provided for an on-board electrical system for a motor vehicle that includes one or more power sources and an electrical subsystem with a switch that can be actuated to selectively bypass a DC/DC converter and a storage device, responsive to electrical parameters such as the power demand of high-power consumers. In one example, when high-power consumers have low and constant power requirements, the switch may be positioned to bridge the DC/DC converter and storage device. Further, the method includes selectively controlling the power source in
(Continued)

order to meet peak power demands with the power source operating at the greatest efficiency for the given operating conditions.

9 Claims, 4 Drawing Sheets

(51) Int. Cl.
H02J 1/08 (2006.01)
H02J 1/12 (2006.01)
H02J 1/10 (2006.01)
H02J 7/14 (2006.01)
H02J 7/34 (2006.01)

(52) U.S. Cl.
CPC ............ *H02J 7/1423* (2013.01); *H02J 7/345* (2013.01); *H02M 3/04* (2013.01); *H02J 1/12* (2013.01)

(58) Field of Classification Search
CPC ... H02J 1/08; H02J 1/108; H02J 1/102; B60N 2/0232
USPC ...... 307/9.1, 10.1, 66, 43; 320/109, 119, 108
See application file for complete search history.

(56) References Cited

U.S. PATENT DOCUMENTS

| | | | |
|---|---|---|---|
| 8,498,767 B2* | 7/2013 | Kotani | H02J 1/00 318/139 |
| 8,659,279 B2 | 2/2014 | George et al. | |
| 8,754,545 B2* | 6/2014 | Wai | H02J 7/34 307/66 |
| 8,786,264 B2 | 7/2014 | Muhammad | |
| 8,860,359 B2 | 10/2014 | Cao et al. | |
| 8,971,073 B2 | 3/2015 | Grant et al. | |
| 9,048,513 B2 | 6/2015 | Butzmann et al. | |
| 2005/0179412 A1 | 8/2005 | Sebille | |
| 2010/0305792 A1 | 12/2010 | Wilk et al. | |
| 2011/0273015 A1 | 11/2011 | Adest et al. | |
| 2012/0043807 A1* | 2/2012 | Ichikawa | B60L 11/182 307/9.1 |
| 2012/0261982 A1 | 10/2012 | Wanke et al. | |
| 2014/0026559 A1 | 1/2014 | Shinagawa | |
| 2014/0084817 A1 | 3/2014 | Bhavaraju et al. | |
| 2014/0306631 A1 | 10/2014 | Jansen | |
| 2015/0270782 A1 | 9/2015 | Hwang et al. | |
| 2015/0372499 A1* | 12/2015 | Purcarea | H02M 7/217 307/104 |
| 2017/0260955 A1* | 9/2017 | Verdier | B60L 1/00 |
| 2017/0267105 A1* | 9/2017 | Fratelli | H02J 7/345 |

FOREIGN PATENT DOCUMENTS

| | | |
|---|---|---|
| DE | 102007037937 A1 | 2/2009 |
| DE | 102012005993 A1 | 11/2012 |
| DE | 102012206932 A1 | 10/2013 |
| DE | 102013206296 A1 | 10/2014 |
| DE | 102014215615 A1 | 2/2016 |
| JP | 5664251 B2 | 2/2015 |

OTHER PUBLICATIONS

Evzelman, M. et al., "Active Balancing System for Electric Vehicles With Incorporated Low-Voltage Bus," IEEE Transactions on Power Electronics, vol. 31, No. 11, Nov. 2016, Published Online Dec. 30, 2015, 20 pages.

* cited by examiner

ON-BOARD ELECTRICAL SYSTEM FOR MOTOR VEHICLES COMPRISING A CONVERTER AND A HIGH-LOAD CONSUMER

RELATED APPLICATIONS

This application claims priority to German Patent Application No. 102016213978.9, filed Jul. 29, 2016. The entire contents of the above-referenced application are hereby incorporated by reference in its entirety for all purposes.

FIELD

The disclosure relates to an on-board electrical system for motor vehicles and to a method for operating an on-board electrical system of this kind.

BACKGROUND/SUMMARY

U.S. Publication No. 2014/0084817 discloses a method for energy and power management in dynamic systems comprising supercapacitors. Here, the sum of the voltage of a battery and of the supercapacitor is applied to a consumer in a first switching state. In the normal load state, the secondary side of the DC voltage/DC voltage converter is connected to the consumer.

U.S. Publication No. 2012/0261982 discloses an on-board multi-voltage electrical system for a motor vehicle. A plurality of DC voltage/DC voltage converters are used, capacitors being associated with said plurality of DC voltage/DC voltage converters. Different operating states can be achieved by means of toggle switches.

U.S. Publication No. 2014/026559 discloses a high-power on-board electrical system for a motor vehicle. Said high-power on-board electrical system has a high-power electrical bus which is at least partially supplied with power by a converter which obtains its input power from the battery of the vehicle. The high-power electrical bus can be at least partially uncoupled from the motor vehicle battery. Consumers with a high electrical power, such as an active wheel suspension or an active chassis or an active suspension for example, are supplied with power by means of the high-power electrical bus.

A consumer with a high electrical power typically has a maximum power consumption of >1 kW or current consumption of >80 A, an average power consumption of 300 W or current consumption of 25 A.

U.S. Pat. No. 8,971,073 discloses a system and a method for bridging (bypassing) multistage DC voltage/DC voltage converters in networks with batteries. No capacitors are used.

U.S. Pat. No. 5,179,508 discloses a voltage supply system comprising a battery and a DC voltage/DC voltage converter. Said DC voltage/DC voltage converter is always in the power flow, it is not bridged.

However, the inventors herein have recognized issues with the above configurations. If the high-power consumers (e.g., high-load consumers) are operating at very low power demands or at high constant loads, energy conversion losses occur in the DC voltage/DC voltage (e.g., DC/DC) converter (s), which dissipate into heat that is transferred to the ambient. Further, these conversion losses decrease the vehicle's fuel efficiency, or in the case of plug-in vehicles such as electric vehicles or plug-in hybrids, add to the total energy consumed. Accordingly, a system is provided herein to at least partly address the above issues. In one example, the system includes an on-board electrical system for motor vehicles, comprising: a battery; a power source which is provided for charging the battery; conventional automotive electrical consumers; a DC voltage/DC voltage converter which, on its primary side, is connected to the battery and, on its secondary side, is connected to a high-load consumer so as to form an electrical subsystem with an energy storage device; an electronic or mechanical switch that connects the high-load consumer to either the energy storage device that is charged through the secondary side of the DC voltage/DC voltage converter, or through a primary power source (e.g., the battery or power source) via an upper diode, wherein in a first switching position, the high-load consumer is supplied power by the primary power supply via the upper diode and, in a second switching position of the switch, the high-load consumer is connected to the storage device and the output of the DCDC-converter, wherein the upper diode allows the primary power supply to supply the high-load consumer, but blocks a current flow in the opposite direction to force any regenerated current to be stored in the energy storage device, wherein a lower diode is connected between the energy storage device and the high-power load, wherein the lower diode is implemented to always block a current flow from the storage device to the conventional loads powered by the primary power supply but transmits a current flow in the opposite direction to facilitate the recuperation of regenerated power from the high-power load; a controller which controls and operates the switch between the first and the second switching positions; and a device for detecting electrical power of the high-load consumer which is associated with the high-load consumer and is connected at the output end to the controller.

In this way, a DC voltage/DC voltage converter may be bridged when the power requirement of a high-power consumer is low (for example less than 40% to 60% of the rated power of the DC voltage/DC voltage converter) and/or constant (for example fluctuation in the current value of less than 10% of the rated value of the power of the high-power consumer). However, the high-power consumer may be supplied with power via the converter when the power requirement of the high-power consumer is high or changes rapidly (for example fluctuation in the current value of greater than 10% of the rated value of the power of the high-power consumer within one second). In one example, a rated power may be defined as the highest power (e.g., maximum) input allowed to flow through a consumer.

Owing to the configuration of the disclosure, the energy efficiency of the system is increased when the DC voltage/DC voltage converter is bridged. Converters of small size may then be used, for example a converter for 210 W may be used instead of a converter with a 300 W rated power. Continuous loading and continuous incidence of heat loss in the converter do not take place. The converter may be used only in relatively short phases of high-power requirement and heat loss arises only in said phases. This is advantageous; energy, in particular fuel, is saved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
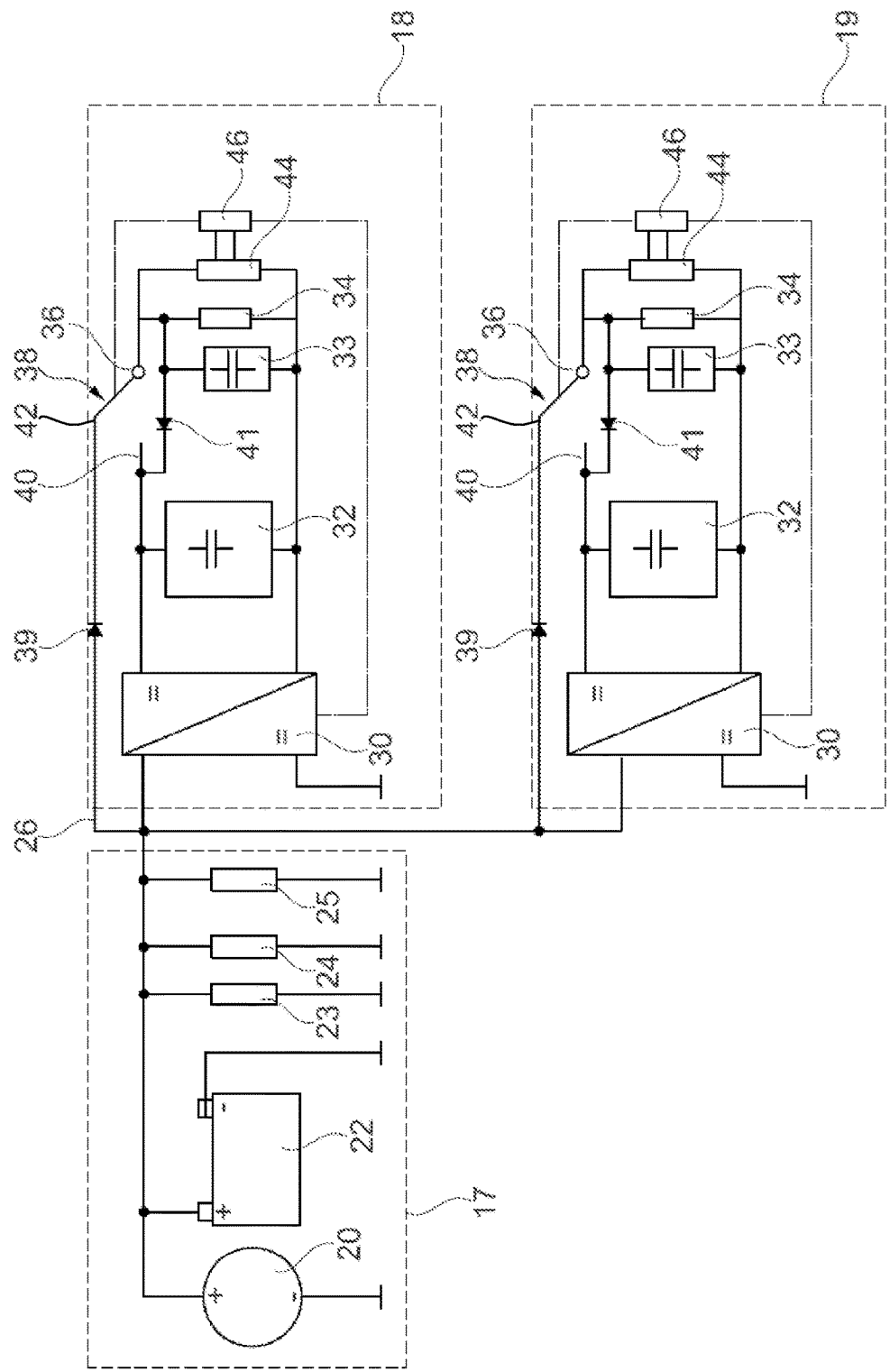
FIG. 1 shows a bridged configuration of an electrical circuit diagram of a battery-assisted on-board electrical system with conventional automotive electrical consumers, a converter and in each case one high-power consumer in a subsystem.

One or more power subsystems including a DC/DC converter and an energy storage device may be used to supply power to high performance electrical systems in a vehicle's power network. This layout is used to stabilize the vehicle's energy distribution network from high dynamic disturbances from the high power electrical consumers. If the high power consumer(s) are operating at very low power demands or at high constant loads, energy conversion losses occur in the DC/DC converter, which dissipate into heat and decreases the vehicle's fuel efficiency. When the power demand of the high power consumer is low or constant, it is not necessary to operate the consumer in a separate subsystem, as the consumer does not cause disturbances.

Thus, according to embodiments disclosed herein, a bypass switch is included to bypass the DC/DC converter and energy storage device during low or constant power demand from the high power system(s). The DC/DC converter and energy storage device are switched active when power demand of the high power consumer becomes high and/or transient. Diodes are also included to direct regenerative currents from the high power consumer to the subsystem energy storage device, while not allowing the energy storage device and DC/DC converter to supply power to conventional consumers that are connected and supplied by the primary power supply. This configuration increases system energy efficiency when bypassing the DC/DC converter and allows a smaller DC/DC converter to be used, as high constant loads do not have to pass through the DC/DC converter, which would necessitate a larger DC/DC converter. The diodes direct regenerative currents from the high power actuators to the subsystem's energy storage device during a bypass mode, therefore the vehicle's primary energy storage device is not charged and the energy can be directly reused in the subsystem power network.

One example high-power consumer includes an active-chassis or drive-system actuator. The power supply to the chassis actuator may include a maximum required power in a dynamic mode (highly fluctuating load, for example during a slalom) of 210 W, with a maximum required power in a constant mode (constant load, for example traveling around a long bend) of 300 W. As such, the DC/DC converter, instead of being configured for traveling around a bend, may be reduced in size to match the power demand of operation during the slalom since the DC/DC converter may be bridged when traveling around a long bend.

The actual power requirement of the high-power consumer may be detected by a device for detecting the power. This device may detect, for example, the current flowing through the high-power consumer. It is then assumed that the voltage is known, for example the voltage may be the battery voltage, and it is then possible to calculate the actual power by multiplication. However, it is also possible to detect the actual power by measuring current and voltage. It is also possible to detect the voltage actually applied to the high power consumer and therefore calculate the actual voltage drop which may allow the current and the actual power to be calculated.

On account of the device for detecting the power, it is possible to generate a control signal which is fed to the control circuit, also called controller. If the measured actual power is lower than a threshold power value, the switch is moved to a first switching position or held in said first switching position. However, if the power is higher than the threshold power value, the switch is held in a second switching position or moved to the second switching position. Additionally, if a rapidly changing power is detected, for example, the current value may fluctuate by more than 10% of the nominal value of the power of the high-power consumer more than twice and, in particular, more frequently within one second, the second switching position is likewise selected. In some example, the nominal value of the power of the high-power consumer may be the rated power of the high-power consumer as defined above.

The embodiments disclosed herein provide for electrical energy to be recovered when the high-power consumer (e.g., actuator) is mechanically moved by external forces and acts as a generator. This is the case when the high-power consumer (e.g., actuator) is an electric motor, for example. In an active chassis, the electric motors that adjust chassis components are also subjected to repelling forces which may be exerted by the road and cause a shift in the electric motors, leading to generation of electrical power. Electrical recuperation may take place in this way. Inductive or capacitive energy stored in the actuator may also be discharged after an actuation. This electrical energy is supplied to the storage device, irrespective of the switching position.

According to the disclosure, this recovery of electrical energy takes place such that the recovered energy is always passed to the storage device. The diodes have the effect that the current flow is always directed to the storage device, which may be a supercapacitor. Electrical energy arrives to the storage device and is stored there. When the switch is in the first switching position, that is to say the converter is bridged, the upper diode blocks a return current in the direction of the battery. In this case, the lower diode is operated in the forward-biased direction allowing current to flow in the direction of the storage device. In the second switching position, the switching tongue closes the lower diode briefly and the regenerative current flows directly into the storage device. The upper diode is not required in this example.

The degree of efficiency of a DC/DC converter is dependent on its output power and output voltage. When a DC/DC converter is used for a load or for a set of loads with different power requirements or levels, the DC/DC converter may operate in an operating range with a low degree of efficiency. As a solution, a DC/DC converter can be bridged or disconnected when it is operated in a range with a low degree of efficiency. Therein, the consumers requiring power are directly supplied with power by a suitably sized DC/DC converter with an increased level of efficiency or by the primary electrical power source. The primary source may include a generator and/or a battery. In some examples, the primary source may also include a DC/DC converter, such as in hybrid vehicles. The output of the DC/DC converters may be connected to a large capacitor, or to a bank of ultracapacitors, or to an auxiliary battery.

When switching over from a load to a plurality of power supply sources, the load may experience voltage jumps which can have a negative influence on the functioning of said load. In one example, these voltage jumps may be mitigated by one or more of balancing the voltages of the sources before switching is initiated, and removing power sources by parallel interconnection and adjusting the output voltages.

In one example, an architecture with a plurality of DC/DC converters or power sources includes a strategy for selecting the most suitable source depending on the degree of efficiency of the DC/DC converter, and further includes a control strategy which allows transition between sources without disruptive changes in voltage. The present disclosure is applicable to vehicles with conventional drives, hybrid drives and electric drives, as well as for on-board electrical systems in aircraft and ships.

In one embodiment, the switch may be a changeover or bypass switch that facilitates the supply of power to the high-load consumer by either the energy storage device and DC/DC converter or the primary power supply.

In the method described above for controlling an on-board electrical system, the power requirement of a high-power consumer is continuously monitored or monitored at short time intervals. In one example, this may include using a device for detecting the power to measure (e.g., sample) power levels and generate a signal that conveys the actual power requirement of the high-power consumer to the controller. The controller may determine a threshold power value and compare the actual power of the high-power consumer with the threshold power value. Based on the comparison, the controller may adjust the position of the switch and adjust the amount of power bypassing the DC/DC converter. In one example, if the actual power measured by the device for detecting power is less than the threshold power value, the controller sends a signal to move the switch to the first switching position. If, however, the actual power measured by the device for detecting power is higher than the threshold power value, the controller sends a signal to move the switch to the second switching position.

Similarly, the controller may determine a threshold rate of change of power value and compare the actual rate of change of power of the high-power consumer with the threshold rate of change of power value. Based on the comparison, the controller may adjust the position of the switch and adjust the amount of power bypassing the DC/DC converter. In one example, if the actual rate of change of power measured by the device for detecting power is less than the threshold rate of change of power value, the controller sends a signal to move the switch to the first switching position so that electrical energy may bypass the DC/DC converter and the storage device. If, however, the actual rate of change of power measured by the device for detecting power is higher than the threshold rate of change of power value, the controller may send a signal to move the switch to the second switching position so that electric energy is conveyed through the DC/DC converter and the storage device. In this way, when the power requirement of the high-power consumer fluctuates in short time periods (e.g., by more than 10% of its rated power within one second) the switch may be actuated to the second switching position and the high-power consumer receives power through the DC/DC converter and storage device.

FIG. 1 shows an electrical circuit divided into three regions 17, 18 and 19. There is a generator 20 in a first region 17 which is also called the primary region or distribution network. Generator 20 is connected in parallel with a battery 22. The battery 22 and, in addition, three conventional automotive electrical consumers 23, 24, and 25 are provided in the primary region 17. Consumers 23, 24, and 25 may be connected and disconnected via switches (not illustrated). In some examples, consumers 23, 24, and 25 may include windshield wiper motors, light sources, electric motors for seat adjustment, and the like.

The primary region 17 is connected to a region 18 (also referred to as an upper subsystem) and to a region 19 (also referred to as a lower subsystem), via a connecting line 26. In the depicted embodiment, subsystems 18 and 19 are physically identical. Therefore, the following description applies to both the upper subsystem 18 and the lower subsystem 19. A DC voltage/DC voltage converter 30, also called DC/DC converter or converter, includes a primary side (e.g., on the left side of converter 30 in FIG. 1) with two connection poles, and a secondary side (e.g., on the right side of converter 30 in FIG. 1) having two connection poles. The rated power of the DC voltage/DC voltage converter 30 is, for example, 300 W.

A lower pole of the primary side and a lower pole of the secondary side are connected to one another and in addition connected to ground potential. The primary side is connected in parallel with the battery 22. A storage device 32, (a supercapacitor, in one example), is connected in parallel with the secondary side of converter 30. The supercapacitor may allow for rapid charging and relatively low losses. Furthermore, there is a high-power consumer 34, also called a high-load consumer, in the subsystem 18. Here, high-power consumer 34 may be, for example, a high-power electric motor as is used for an active chassis. The high-power electric motor is connected to ground by way of a lower connection and is connected by a mechanical or electronic switch to either the primary power supply or the energy storage device in parallel with a DC/DC converter. Switch 38 has a first, lower switching contact 40 which allows the high-power load 34 to be powered by the converter 30 and the storage device 32. Switch 38 additionally has a second, upper switching contact 42 which allows the high-power load 34 to be powered by the primary power supply via an upper diode 39. The upper diode 39 is connected to the primary power supply via connecting line 26, and may be known as a primary diode.

The polarity of the upper diode 39 is such that said upper diode 39 allows power to be supplied to the high-power consumer 34 directly from the battery 22, bypassing the converter 30. In the exemplary embodiment shown, the ground potential is connected to the negative side of battery 22, and the connecting line 26 is connected to the positive side of battery 22. Accordingly, the anode of the upper diode 39 is connected to the connecting line 26; the cathode is connected to the second switching contact 42. As a result, current can flow only to the high-power consumer 34, but not in the reverse direction (e.g., from the high-power consumer 34 to the battery 22). Electrical energy which is generated by the high-power consumer 34 is therefore blocked by the upper diode 39 and cannot reach the battery 22.

A lower diode 41 is arranged between the first switching contact 40 and the switching tongue 36. Lower diode 41 is short-circuited when the switching tongue 36 is in the second switching position (not illustrated here), without bridging of the converter 30. The lower diode 41 is oriented such that it blocks the supply of power to the high-power consumer 34 from the storage device 32 or from the converter 30 in the case of normal voltage supply, but operates in the on-state mode in the case of regeneratively occurring electrical power, that is to say passes said electrical power to the storage device 32.

A device 44 for detecting power is associated with the high-power consumer 34. Device 44 detects the actual power requirement of the high-power consumer 34. This can be performed, for example, by detecting the current flowing through the consumer 34, and based on the voltage that corresponds substantially to the output voltage of the converter 30 or the battery 22, (12 V, for example). The actual power can then be calculated by multiplying the current and the voltage. However, in addition, the voltage which is actually applied to the high-power consumer 34 can also be directly measured, so that improved power detection is possible. However, it is also possible to estimate, using only one voltage measurement, the current actually flowing through the high-power consumer 34 since the voltage actually applied to the high-power consumer 34 depends on the level of the current flowing through said high-power consumer 34.

A further energy store 33, for example a capacitor module or Lithium-Ion battery, can also be provided in parallel with the high-power consumer 34, either in addition to or instead of the energy storage device 32.

Furthermore, a control circuit (e.g., controller) 46 is provided in the subsystems 18 and 19. Control circuit 46 controls the switching position of the switch 38. The control circuit receives its input signal from the device 44 for detecting power. A threshold value for the power (e.g., threshold power value or threshold value) is determined by the control circuit 46. Furthermore, the control circuit 46 detects a change in the power over time (e.g., a rate of change of power consumption). In one example, the control circuit 46 may check actual power values (e.g., via sampling) in specified, short time intervals. As long as the power requirement, or actual power being used, is below the threshold value, the first switching position (as shown in FIG. 1) is selected. Here, the converter 30 is bridged by the interconnection of the conductive upper diode 39 in the supply path, and the converter 30 is bypassed. However, if the actual power requirement of the high-power consumer 34 is above the threshold value, the control circuit 46 operates the switch 38 to the second switching position. In this case, the switching tongue 36 is connected to the secondary side of the converter and to the storage device 32.

The control circuit also has the task of deactivating the DC/DC converter 30 if switch 38 is set such that the high-powered loads are powered by the primary power supply and the energy storage device is charged, including that the energy storage device contains a quantity of stored electrical energy above a threshold.

As described, the DC voltage/DC voltage converter may be bridged when the power requirement of a high-power consumer is low. In one example, a low power requirement of a high-power consumer may be defined as when the power requirement is less than 40% to 60% of the rated power of the DC voltage/DC voltage converter. Therein, if the high-power consumer is drawing less than 40%-60% of the rated power of the DC/DC converter, the converter may be operating at decreased efficiency and can be bridged because the power supply can meet the power requirement more efficiently without the converter. In other examples, the low power requirement of a high-power consumer may be defined as when the power requirement is less than 40% to 60% of the rated power of the high-power consumer, which may also cause the converter to operate at decreased efficiency.

The DC/DC converter may also be bridged when the power requirement of a high-power consumer is constant (for example fluctuation in the current value of less than 10% of the rated value of the power of the high-power consumer).

During operating conditions when the power requirement of the high-power consumer is high (e.g., above 40% to 60% of the rated power of the high-power consumer or the DC/DC converter, in two examples) or changes rapidly (e.g., fluctuates by greater than 10% of the rated value of the power of the high-power consumer within one second), the high-power consumer may be supplied with power via the converter.

The controller 46 decides which electrical power source supplies power to a load. The power sources may include the battery 22, the generator 20, or the DC/DC converter 30. Each may be selectively permanently connected to a large capacitor, ultracapacitor, or battery at a respective output.

Two criteria may be used by the controller 46 in order to decide which power source to select for supplying power to a consumer. The first criteria may include the decision being made to select the source with the highest degree of efficiency for the required power if this source is sufficiently dimensioned to supply the required power peaks. The second criteria may include if a consumer requires high power peaks, the controller 46 may select a source which can supply such peaks with a greater degree of probability. For example, a generator and conventional lead-acid battery cannot always supply high peak currents, but a power source which is made up of a DC/DC converter and an ultracapacitor can supply high peak currents more effectively and more reliably. Therefore, a source of this kind is selected when certain consumers are activated.

If the power which is called up by the high-power consumer 34 changes in short time intervals, for example varies more than twice in one second and, in particular, more frequently by more than 10% of the rated power of the high-power consumer 34 within one second, the second switching position is also selected. The high-power consumer 34 may be shut off in response to the power changing twice within half a second or one tenth of a second and, in particular, more frequently by more than 10% of the rated power of the high-power consumer 34 within half a second or one tenth of a second.

Particularly in the case of a hybrid vehicle, it is possible to have a plurality of DC/DC converters as the primary power source. This is the case, for example, when the vehicle is a plug-in hybrid or battery electric vehicle (BEV), and the low-voltage supply system is supplied by the domestic supply system (plug socket) or by a drive system. In this case, the controller 46 selects the source with the highest degree of efficiency for the required power. Further detail regarding this embodiment will be described in reference to FIG. 3.

The required power may be calculated by measured voltage and current. It can also be identified with a feed-forward approach. In this case, the controller 46 monitors the activation of one or more consumers. If a consumer is activated, its load, which is already known and stored, is used to decide which electrical power source is the most suitable. This method has the advantages that it does use additional sensors and no time is taken to calculate the power. One or more power sources are selected depending on the decision made by the controller 46. Depending on the selected realization of the concept, this is done by source selection using a mechanical or semiconductor switch or by raising the output voltage of a selected source when the sources are connected in parallel, as illustrated above. When a source is selected in this way, it is likewise possible to lower the output voltages of the remaining sources. If the switch(es) are configured such that a DC/DC converter is not supplying a high-power consumer, and the energy storage device is charged, the controller deactivates the DC/DC converter to further improve system efficiency. If the DC/DC converter is reactivated, the switches are configured such that the DC/DC converter may supply power to the high-power consumer in parallel with the energy storage device.

If a source is selected by bridging one or more sources using a mechanical or semiconductor switch, the output voltage can be preset, so that the load undergoes a minimal change or no change in the supply voltage. The output voltage of the old sources can likewise be set, so that the transition runs smoothly. After the transition has taken place, the output voltage of the selected source can be regulated to an optimum voltage. This voltage can be selected to be optimal in respect of degree of efficiency, service life of electrical consumers, or other criteria. When regulating the voltage, the voltage/time gradient should be selected such that the functions of the consumers are not adversely affected. After the transition has taken place, a power source which would be bridged can be completely disconnected in order to avoid losses due to low-load power.

In one example, an on-board electrical system for motor vehicles includes a battery 22 and a converter 30 which, on a primary side, is connected to the battery 22 and, on a secondary side, is connected to a storage device 32 so as to form an electrical subsystem and is connected to a high-load resistor 34 such that it can be switched by a switch 38. The switch 38 has a switching tongue 36 which is connected to the high-load consumer 34, a first switching contact 40 which is connected to the storage device 32, and a second switching contact 42 which is connected to the primary side via an upper diode 39. The high-load consumer 34, in a first switching position, is connected to the primary side via the upper diode 39 and, in a second switching position, is connected to the storage device 32 and the secondary side. A lower diode 41 is connected between the switching tongue 36 and the first switching contact 40. A controller 46 controls and operates the switching position of the switch 38 between the first and the second switching position. A device for detecting the actual electrical power 44 of the high-load consumer 34 is associated with the high-load consumer 34 and is connected at the output end to the controller 46.

Figure 2:
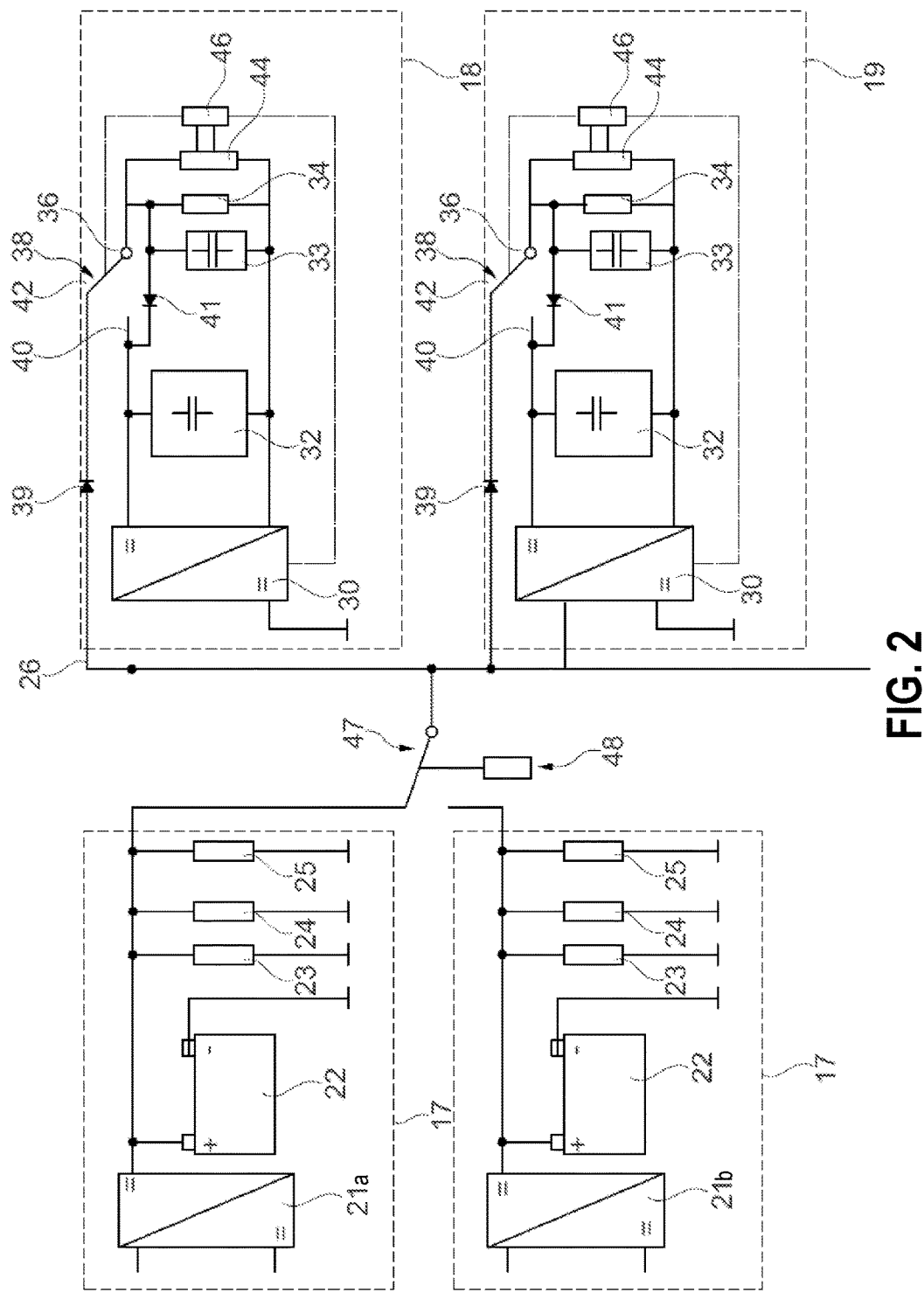
FIG. 2 shows the circuit diagram as in FIG. 1, but now with two different electrical energy sources.

Turning now to FIG. 2, it shows an electrical circuit similar to the electrical circuit of FIG. 1. As such, like components previously introduced in FIG. 1 are numbered similarly in FIG. 2, and are not reintroduced. FIG. 2 corresponds to FIG. 1 with the following exceptions: instead of supplying power to the 12 V on-board electrical system by the generator 20, power is now selectively supplied by an upper DC/DC converter 21a or a lower DC/DC converter 21b, as may be the case in hybrid and electric vehicles. One of the converters 21a and 21b may be connected to the connecting line 26 by a switch 47 (also known as a power source switch). In the depicted embodiment shown in FIG. 2, DC/DC converter 21a is connected to the connecting line 26 via switch 47 and DC/DC converter 21b is not connected to the connecting line 26. A control device 48 controls switch 47; the statements made in respect of the control circuit (e.g., controller) 44 may also apply to control device 48.

When DC/DC converter 21a is decoupled, the loads to which it supplies power are supplied with power by DC/DC converter 21b, or by a primary electrical power source. As described above, the primary electrical power source can include one or more of a generator (e.g., generator 20 of FIG. 1) and a battery 22, or it can be a DC/DC converter which is supplied with power by the high-voltage system. There are two fundamental methods of removing a DC/DC converter from the power supply in order to improve the degree of efficiency of the entire system or vehicle.

As illustrated in FIG. 1, DC/DC converter 21a or DC/DC converter 21b can be removed from the supply using a conventional switch (e.g., switch 38 of FIG. 1 or switch 47 of FIG. 2). In this case, the DC/DC converter removed from the supply may be completely switched off in order to avoid no-load losses. Either the primary electrical power source or a second DC/DC converter will take over the supply of power in this case. In order to avoid the load being subject to voltage fluctuations when a DC/DC converter is removed, the new DC/DC converter or the primary power source may be controlled such that the voltage across the load remains constant when the transition takes place. If the primary power source is controlled in this way, it is controlled as slowly as possible to the new voltage in order to avoid the rest of the consumers being subject to voltage fluctuations. If the primary power source takes over the supply of power, it can then be slowly regulated back to its original voltage.

FIGS. 1-2 show conventional switches which control the flow of power from DC/DC converters to high-power loads and energy storage devices. Bipolar transistors or MOSFETs can likewise be used as switches when a DC/DC converter is bridged in this way. The DC/DC converters may be deactivated if the switches are configured such that the high-power loads (e.g., consumers) are not supplied by the DC/DC converters and the energy storage devices are completely charged.

Figure 3:
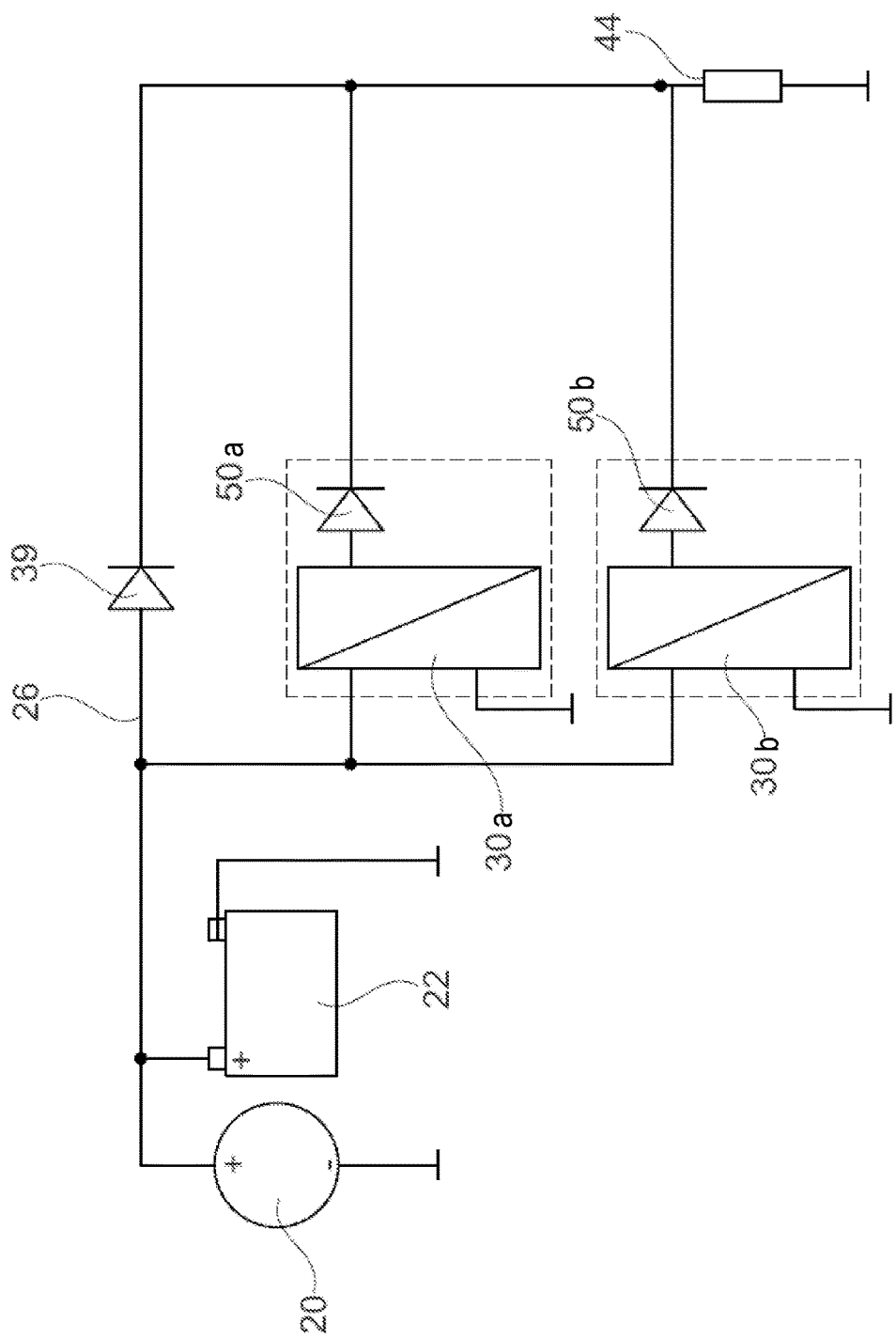
FIG. 3 shows a basic illustration of a circuit as in FIGS. 1-2 for removing a power supply by voltage regulation operations.

FIG. 3 shows an electrical circuit configured to depict a second method of removing a DC/DC converter from the power supply in order to improve the degree of efficiency of the entire system or vehicle. FIG. 3 shows an electrical circuit that includes similarities with the electrical circuits of FIGS. 1-2. As such, like components previously introduced in FIGS. 1-2 are numbered similarly in FIG. 3, and are not reintroduced.

FIG. 3 shows an electrical circuit configured to selectively remove a DC/DC converter from the power supply that includes two converters 30a and 30b. Two different electrical power sources, the top converter 30a and bottom converter 30b, are connected in parallel. The output voltages of converters 30a and 30b are set as described above and taking into account the following considerations.

Each DC/DC converter 30 (e.g., converter 30a, 30b) has a respective diode 50 (e.g., diode 50a, 50b) connected to one of its two output poles which prevents current flowing into the respective DC/DC converter (e.g., 30a and 30b) when the voltage of the primary electrical power source or the output voltage of the other DC/DC converter is greater than its own output voltage. In this case, a DC/DC converter is removed from the power supply when the output voltage of the primary source or the output voltage of a second DC/DC converter is greater than its output voltage. In this case, a converter is effectively taken from the power supply as if it is connected to the load by way of a switch. This method has the following advantage: when the selected source (primary source or second DC/DC converter) is saturated (reaches its maximum power), the output voltage automatically drops. In this case, the remaining source takes over the supply of power to the load, without there being an interruption in the power supply or a rapid change in the voltage across the load. In one example, the remaining source may be able to provide additional power, beyond what the saturated elected source is providing, in order to meet the power demand.

In some examples, converter 30a and/or converter 30b may be coupled to additional components not shown in FIG. 3. For example, an energy storage device (such as device 32)

and a high-power load/consumer (such as consumer 34) may be electrically coupled to converter 30a and/or converter 30b, similar to the systems described above with respect to FIGS. 1-2. Further, an additional respective diode (such as diode 41) may be coupled to each converter to only allow recuperation from the high-power load to the energy storage device without allowing the energy storage device to power other loads than those on its subnet (high-power load or otherwise).

The controllers described above (e.g., control circuit 46 and/or control device 48) may be electronic controllers comprising memory storing instructions executable by a processor to control the switching position of the various switches as described above. In such examples, control circuit 46 and control device 48 may comprise a single control unit or may comprise separate control units in communication with each other. Control circuit 46 and/or control device 48 may be in communication with a controller of the vehicle, such as the engine or powertrain control module. In other examples, control circuit 46 and/or control device 48 may be passive devices that control a respective switch based on an input signal relative to reference signal, for example. In one example, the control circuit 46 may receive a voltage, current, or power measurement from device 44 as an input signal and adjust the position of switch 38 based on the input signal relative to a reference signal, which may be a maximum rated power of the consumer in one example.

Figure 4:
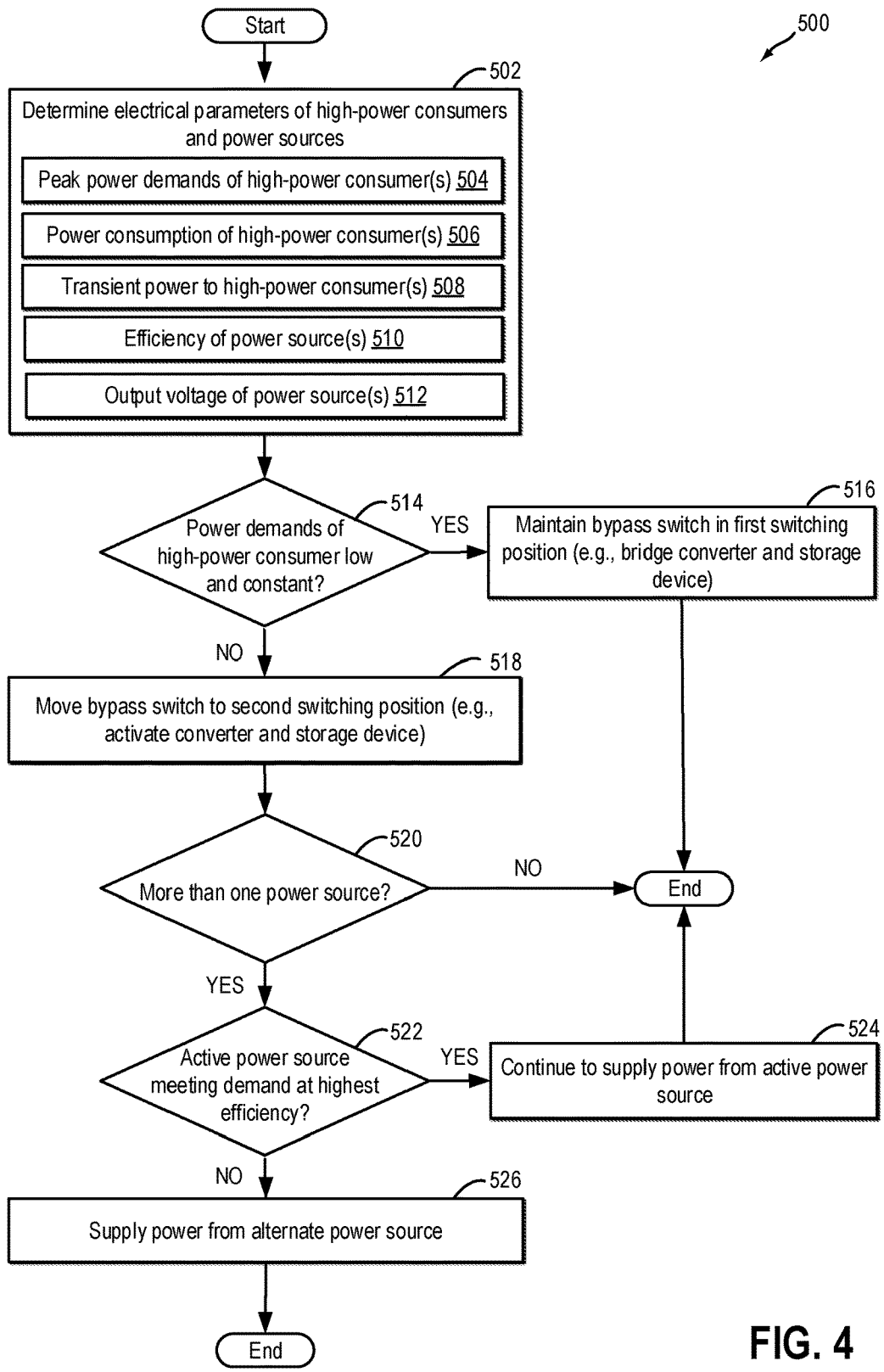
FIG. 4 shows an example control method for managing a vehicle electrical system.

Turning now to FIG. 4, it shows an example control method for selecting the power source for an electrical circuit. Instructions for carrying out method 500 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below. In one example, the controller (e.g., control circuit 46 of FIGS. 1-2) may receive an indication of actual power consumed by a high-power consumer (e.g., high-power consumer 34 of FIGS. 1-2). In some examples, the indication of actual power consumed may be measured by a device for measuring electrical power (e.g., device 44 of FIGS. 1-3). Responsive to the indication of actual power consumed by the high-power consumer, the controller may compare the actual power consumed to a power threshold. If the actual power consumed by the high-power consumer is less than the power threshold, then the controller may send a command signal to a switch (e.g., switch 38 of FIGS. 1-2) in order to move the switch to a first switching position so that a DC/DC converter (e.g., DC/DC converter 30 of FIGS. 1-2) and a storage device (e.g., storage device 32 of FIGS. 1-2) may be bridged. In this way, the DC/DC converter and the storage device may be bypassed when power demands of the high-power consumers can be met without activating the DC/DC converter and the storage device. As a result, the size of the DC/DC converter may be decreased while still meeting electrical system requirements, and efficiency may increase.

Method 500 starts at 502, where the method includes determining electrical parameters of the high-power consumers and the power sources included in the vehicle electrical system. At 504, electrical parameters may include determining the peak power demand of high-power consumers included in the vehicle system. In one example, a peak power demand of a high-power consumer may be the maximum power that a high-power consumer may be anticipated of requiring during operation. At 506, electrical parameters may also include determining power consumption of high-power consumers. In one example, this may include measuring the actual power using a device for detecting power, such as previously described device 44 of FIGS. 1-3. At 508, electrical parameters may also include determining whether the power demands of the high-power consumers are transient. In one example, this may include determining whether the actual power consumption of the high-power consumers is changing rapidly (e.g., fluctuating) within a set amount of time. Other electrical parameters may include, at 510, determining the efficiency of power sources. It will be appreciated that more than one power source may be included in the electrical system. Additional electrical parameters may include, at 512, determining the output voltage of the power sources. As previously described, examples of power sources may include one or more of a battery (e.g., battery 22 of FIGS. 1-3), a generator (e.g., generator 20 of FIGS. 1-2), and a DC/DC converter (e.g., DC/DC converter 21a and 21b of FIG. 2). Multiple power sources may be selectively coupled electrically to electrical subsystems (e.g., subsystems 18 and 19 of FIGS. 1-2) using a switch (e.g., switch 47 of FIG. 2) or using voltage regulation as shown in FIG. 3.

At 514, the method includes determining whether the power demands of the high-power consumers are low and constant. In one example, a low power requirement may be defined as a power requirement of less than 40% to 60% of the rated power of the high-power consumer. In other examples, a constant power requirement may be defined as a power requirement that fluctuates less than 10% of the rated power value of the high-power consumer. In this way, energy conversion losses occurring in the DC/DC converter (s), which dissipate into heat that is transferred to the ambient at low power requirements may be avoided. Further, the decrease in fuel economy associated with such conversion losses may also be avoided.

If the power demands of the high-power consumer(s) are low and constant, then the method continues to 516, where the method includes maintaining the bypass switch in a first switching position. In the first switching position, the DC/DC converter and storage device are bypassed, or bridged, and power directly from the power source supplies the high-power consumer without passing through the DC/DC converter or the storage device.

If the power demands of the high-power consumer and not low and constant, then the routine proceeds to 518, where the routine includes moving the bypass switch to a second switching position. In the second switching position, the DC/DC converter and storage device are not bypassed, or bridged, but rather activated and power from the power source passes through the DC/DC converter and the storage device before going to the high-power consumer. In this way, responsive to a transient electrical demand, or a high power demand by the high-power consumers, the DC/DC converter and storage device may be operated to deliver a suitable amount of power to the high-power consumers.

At 520, the method includes determining whether the electrical system includes more than one power source. As previously described power sources may include one or more of a battery, a generator, and a DC/DC converter. If the electrical system does not include more than one power source, the method ends. If the electrical system does include more than one power source, then the method continues to 522, where the method includes determining whether the active power source is meeting the power demands of the high-power consumers and the highest efficiency. In some examples, efficiency may be defined as the ratio of total output power to input power. Typically, efficiency of a power supply is specified at full load and nominal input voltage (e.g., 12V). As previously described, efficiencies of the power sources were determined at 502. If the active power source is meeting all power demands of power consumers in the electrical system at the highest of all available efficiencies, then the method proceeds to 524, where the method includes continuing to supply power from the currently active power source. The method then ends.

If the active power source is not meeting the power demand at the highest available efficiency, then the routine proceeds to 526, where the routine includes supplying power to the high-power consumers from an alternate power source. In one example, this may include removing one or more power sources from the power supply. In some examples, the controller may send a command signal to a power source switch (e.g., switch 47 of FIG. 2) in order to electrically decouple one power source and electrically couple another. In other examples, such as in the voltage regulator configuration of FIG. 3, the switch between power sources may be automatic in order to regulate the power source supplying power to the high-power consumers.

In this way, when the power demands of high-power consumers are low and/or constant, DC/DC converter(s) may be bridged, thereby reducing energy conversion losses occurring in the DC/DC converter(s). As a result, the energy conversion losses dissipated into heat and transferred to the ambient at low power requirements may be avoided. By reducing energy conversion losses, fuel economy may increase. Selecting a DC/DC converter with the highest efficiency will also decrease energy use, especially in the case of plug-in vehicles while that are being charged on-plug through utility lines. The technical effect of selectively utilizing DC/DC converter(s) or the primary power supply as the source of power for a subnet is that the overall efficiency of the power supply system may be increased when a power supply is selected for use based on its higher efficiency or because it produces a decreased amount of losses. Further, this allows converters of smaller size to be implemented. The likelihood of degradation associated with continuous loading and continuous heat loss in the converter is reduced by bridging the converter (and storage device, if applicable) at low and/or constant loads.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An on-board electrical system for motor vehicles, comprising:
   a primary power supply;
   at least one conventional automotive electrical consumer which is connected to the primary power supply in a switchable manner;
   a DC voltage/DC voltage converter which, on a primary side, is connected to the primary power supply and, on a secondary side, is connected to a high-load consumer;
   a switch that connects the high-load consumer either to an energy storage device that is charged by the DC voltage/DC voltage converter, or the primary power supply via an upper diode, wherein the upper diode allows the high-load consumer to be powered by the primary power supply, but does not allow conventional automotive loads to be powered by the energy storage device and the DC voltage/DC voltage converter, wherein a lower diode is configured to allow recuperation of energy from the high-load consumer while not allowing the energy storage device and DC voltage/DC voltage converter to supply power to the conventional automotive loads powered by the primary power supply;
   a controller which controls and operates the switch; and
   a device for detecting electrical power of the high-load consumer which is associated with the high-load consumer and is connected at an output end to the controller,
   wherein one of two connections of the primary side is connected to one of two connections of the secondary side of the DC voltage/DC voltage converter, and wherein the primary power supply comprises an alternator and a starter battery.

2. The on-board electrical system as claimed in claim 1, wherein the controller is configured to position the switch to connect the high-load consumer to the energy storage device when a power requirement of the high-load consumer is less than 40 to 60% of rated power, and is configured to position the switch to connect the high-load consumer to the primary power supply when the power requirement is greater than 40 to 60% of the rated power.

3. The on-board electrical system as claimed in claim 1, wherein the controller is configured to position the switch to connect the high-load consumer to the energy storage device when a rate of change of power requirement of the high-load consumer is greater than a rate of change of power threshold.

4. The on-board electrical system as claimed in claim 1, wherein the energy storage device is an ultracapacitor, a lithium-ion battery, or another energy storage device that is configured to supply and absorb transient electrical power.

5. The on-board electrical system as claimed in claim 1, wherein the high-load consumer is an active-chassis or drive-system actuator.

6. The on-board electrical system as claimed in claim 1, wherein the primary power supply comprises a generator.

7. The on-board electrical system as claimed in claim 1, wherein the DC voltage/DC voltage converter is a first DC/DC converter, and wherein the primary power supply comprises a second DC/DC converter.

8. An on-board electrical system for a motor vehicle, comprising:
   a primary electrical power source generating a primary output voltage and comprising a battery and a generator which is provided for charging the battery;
   a first DC/DC converter generating a first output voltage and coupled to a first diode;
   a second DC/DC converter generating a second output voltage and coupled to a second diode;
   a primary diode for preventing a conventional automotive electrical load powered by the primary electrical power source from being powered by the first DC/DC converter or the second DC/DC converter when the first output voltage or the second output voltage is greater than the primary output voltage;
   the first diode for preventing current from flowing into the first DC/DC converter when the primary output voltage or the second output voltage is greater than the first output voltage;
   the second diode for only allowing recuperation from a high-power load to an energy storage device without allowing the energy storage device to power other loads than those on a subnet of the energy storage device.

9. The on-board electrical system of claim 8, wherein the DC/DC converter producing the lower of the first output voltage and the second output voltage is removed from supplying power unless the DC/DC converter producing the higher of the first output voltage and the second output voltage is saturated.

* * * * *